US010749902B2

(12) United States Patent
Testu (10) Patent No.: US 10,749,902 B2
(45) Date of Patent: Aug. 18, 2020

(54) METHOD AND APPARATUS FOR ORGANIZING ELEMENTS OF A SERVER APPLICATION IN A CLIENT-SERVER SYSTEM

(71) Applicant: NEURALCAT, Å Orsay (FR)

(72) Inventor: Benoît Testu, Bondoufle (FR)

(73) Assignee: NEURALCAT, Paris (FR)

( * ) Notice: Subject to any disclaimer, the term of this patent is extended or adjusted under 35 U.S.C. 154(b) by 261 days.

(21) Appl. No.: 15/499,544

(22) Filed: Apr. 27, 2017

(65) Prior Publication Data
US 2017/0374103 A1    Dec. 28, 2017

(30) Foreign Application Priority Data

Apr. 29, 2016 (FR) ...................................... 16 53917

(51) Int. Cl.
| | |
|---|---|
| *G06F 15/16* | (2006.01) |
| *H04L 29/06* | (2006.01) |
| *G06F 15/173* | (2006.01) |
| *G06F 12/08* | (2016.01) |
| *G06N 5/02* | (2006.01) |

(52) U.S. Cl.
CPC ............. *H04L 63/20* (2013.01); *G06F 12/08* (2013.01); *G06F 15/173* (2013.01); *G06N 5/02* (2013.01)

(58) Field of Classification Search
CPC ......... G06F 12/08; G06F 15/173; G06N 5/02; H04L 63/20
See application file for complete search history.

(56) References Cited

U.S. PATENT DOCUMENTS

| | | | | |
|---|---|---|---|---|
| 5,559,958 | A | * | 9/1996 | Farrand ............... G06F 11/0709 709/223 |
| 6,006,280 | A | * | 12/1999 | Morningstar ........... G06F 9/465 719/313 |
| 6,073,135 | A | * | 6/2000 | Broder .................. G06F 16/954 |
| 6,115,549 | A | * | 9/2000 | Janis ........................ G06F 8/61 707/999.01 |
| 6,115,646 | A | * | 9/2000 | Fiszman ................ G06Q 10/10 700/104 |

(Continued)

FOREIGN PATENT DOCUMENTS

EP         1428117 B1    4/2002

OTHER PUBLICATIONS

Walton, Andy, Types of LAN & WAN Networks, smallbusiness.chron.com/types-lan-wan-networks-69851.html, Demand Media, Jan. 7, 2015. (Year: 2015).*

*Primary Examiner* — Moustafa M Meky
*Assistant Examiner* — Thorne E Waugh
(74) *Attorney, Agent, or Firm* — TraskBritt (57) ABSTRACT

A distributed computing system includes a plurality of servers, each server comprising a processor to process computing treatments and a memory system to record and save graphs. The system also includes means of routing between servers and an interface server to treat requests from a plurality of users' equipment. Servers are organized in N layers of servers, building together a group of servers. Servers from a same layer present a ring topology, and each server has a communication protocol with the following server in the ring of the group of machines. The system also includes communication means with the routing server.

11 Claims, 7 Drawing Sheets

(56) References Cited

U.S. PATENT DOCUMENTS

| | | | |
|---|---|---|---|
| 7,383,327 B1* | 6/2008 | Tormasov | H04L 41/082 |
| | | | 709/220 |
| 7,529,784 B2* | 5/2009 | Kavuri | G06F 3/0605 |
| 8,661,130 B2* | 2/2014 | Sonoda | G06F 9/5061 |
| | | | 709/226 |
| 9,992,230 B1* | 6/2018 | Haverty | H04L 63/20 |
| 10,331,740 B2* | 6/2019 | Low | G06F 16/254 |
| 2010/0293334 A1* | 11/2010 | Xun | G06F 16/9014 |
| | | | 711/129 |
| 2012/0188248 A1 | 7/2012 | Eames et al. | |
| 2012/0188249 A1 | 7/2012 | Kretz et al. | |

* cited by examiner

METHOD AND APPARATUS FOR ORGANIZING ELEMENTS OF A SERVER APPLICATION IN A CLIENT-SERVER SYSTEM

PRIORITY CLAIM

This application claims the benefit of the filing date of French Patent Application Serial No. FR16/53917, filed Apr. 29, 2016, for "Servers Architecture and Data Redistribution Process to Distribute a Versioned Graph."

TECHNICAL FIELD

The field of the invention is related to computer systems designed to process versioned data and thus answer a request in real time. It is related more precisely to the process of a small amount of highly contextualized data.

BACKGROUND

European patent EP1428117 B1 describes a process and a system designed to organize elements from a server application to a client-server system.

In the EP1428117 B1 solution, server and client components of an application follow a pattern of complementary hierarchical graphs, such as arborescences or directed acyclic graphs. One or several vertices of the server graph are connected through a communication interface. This interface connects vertices from different client graphs. The server graph contains the union of all the client vertices. On the other hand, each client graph only contains a subset from the server graph. Autonomous graph objects (named "actors") can be put together in order to build composite object graphs dealing with both the server and client sides. Therefore, client-server applications can be made at runtime, from hierarchical-ordered collections of actors. Each actor is safe from the other ones and a securitized interface grants owners (e.g., external sources or suppliers) distant access and actor updates.

U.S. Patent Publication No. 2012/0188249 is a major part of the state of the art. It describes a system based on a graph that is distributed in one or many partitions associated with one or many services. The graph partition services communicate with the whole graph. This way, requests performed from a given partition can reach the distributed graph.

In practice, such distribution is necessary to manage treatments requested by the different users in the thousands, even millions of them. Such treatments are simultaneously performed on the server. It requires big computing resources and an escalating execution time—sometimes too much. By increasing the number of machines and distributing the general graph, it is now possible for every user to deal with a specifically desired subgraph of the whole general graph.

Solutions from the existing state of the art, especially in U.S. Patent Publication No. 2012/0188249, are focused on the fact that all the users have to share the same global graph, modified by all the users at the same time. This described solution allows a user to get the subgraph he requires. A user's subgraph is built by sending requests to all the servers that host the different partitions of the general graph.

This solution from current state of the art only provides users with a single general graph that is shared by all the users. This general graph is distributed on many servers, and it results in conflicts between the different modifications asked by the different users. It is impossible to get a specific context for each user. A user cannot create a specific context to apply a process on the graph. He can only process and modify the whole general graph.

In addition, this solution from the current state of the art cannot provide each user with a personal graph. In the solutions of the state of the art, all the users have only access to the same global graph. Through this process, it is not possible to provide a given user with his personalized service, which would rely on distributed computing resources.

This results in a huge loss of performance. Information is massively redundant in each user's subgraph. This performance loss is a major limit to manage thousands of users on large-sized graphs.

An expert would be naturally driven to solve this issue by duplicating for each existing user the general graph or sub-graphs of the general graph.

This would also imply multiplying the number of server clusters to manage all of this data or let the user's computer manage it itself. In both cases, there would be additional drawbacks: there would be no way to share common information between the users. However, common information between the users' graphs is massive.

In addition, hardware resources would be multiplied, and would not be exploited in an efficient and optimized way.

BRIEF SUMMARY

To solve all of these drawbacks, the following disclosure relates to a general acceptation of a distributed computing system. This system contains a plurality of servers, each server having a processor to process computing treatments and a memory system to save graphs, a routing system between all the servers and an interface server to process requests from a plurality of users' equipment, characterized by the fact that:

Servers are organized in N layers of servers and form, for each one of the layers, a group of servers (group of machines). Servers from the same layer are built in a ring topology and each server has a communication protocol with the following server in the ring.

Communication protocols with a routing server.

Each server from a layer communicates directly with all the servers from the direct lower layer.

Each server from a layer is characterized by:

A memory cache to save graphs related to a specific user or group of users.

A memory cache to save hashed data that summarizes the content of lower layers' graphs related to the graphs of the server.

A memory cache to ephemerally save treatment results from lower layers and/or a user's layer.

A memory cache to ephemerally save data from lower layers in the upper layers.

What is meant by "ephemerally" in this disclosure is the fact that a saved information in a memory cache is expected to be often modified depending on the evolution of the content of the lower layers.

What is meant by "sustainable" in this disclosure is the fact that a saved information in a memory cache is expected to sometimes be deleted, about once a day. Those deletions are not depending on the user's requests. They depend in an asynchronous way on the evolution of the content in lower layers.

This solution improves system performance. First, it optimizes the distribution of information between the upper layers, depending on each request of the users, and saves in a memory cache the context of each user. Second, it saves in the lower layers information shared by a group of users. This information is redistributed in the upper layers.

The following disclosure also concerns a real-time requesting process of an information system organized as a multi-layer versioned graph. This data structure provides each user with his own graph, which will share information with other users' graphs.

Therefore, the goal of this method is to provide the user with the ability to call up his own graph and update it in real time with different operations.

In principle, this method is to rebuild on a server from the USER layer a graph that only belongs to the user, and make it usable by him in real time.

By this process, a structure is obtained that is distributed on many servers that can both manage graphs specific to each user and share common information between all of the users.

The system relies on a group of server machines, a routing server and at least one database server.

Groups of server machines host data specific to elements of the general multi-layer versioned graph.

The requesting process comprises:
Instantiation steps of the elements of the general multi-layer versioned graph, which means:
  select one of the servers depending on parameters such as CPU charge of each server, free memory available of each server, type of the element we want to instantiate, the similarities between the affiliation of the element and the affiliation of the elements already instantiated on the server and the element affiliation to store on the selected server,
  propagate the instantiation in the group of machines network,
  completion steps of the specific hosted data, which means the recursive transfer of data between two successive adjacent layers of servers, in response to a lack of information in the upper layer,
  save transferred data in memory caches related to servers of the lower and upper layers,
Data synchronization steps between lower and upper layers, keeping the integrity of the data structure when a user produces new content.

BRIEF DESCRIPTION OF THE DRAWINGS

The disclosure described herein will be better understood while referring to the description of a non-limitative realization example wherein:

FIG. 7 is specific to user 1;

FIG. 8 is specific to user 2;

DETAILED DESCRIPTION

Terminology

In this disclosure, the following technical terms are defined:

A "graph" is a set of vertices linked by edges.

A "multilayer versioned graph" is a tree of graphs. Each graph depends on information contained in the parent graphs of its filiation.

Each graph can add or remove a vertex or an edge in comparison with its parent graph.

Therefore, a vertex has many versions of itself through the tree of graphs. There is a "root vertex" in a parent graph that contains all the internal information of the vertex and all the basic edges.

In the graphs that inherit from a parent graph, the "root vertex" becomes a "versioned vertex," which updates edges of the vertex for each new added graph to the parent graph filiation.

A graph can use information from the lower graphs it inherits from. Therefore, when a vertex and its edges in a particular graph are considered, the complete information will be all the edges contained in the current graph and in the lower graphs the current graph inherits from.

Graphs in a "multilayer versioned graph" can be classified by the level of information they contain.

A "layer" is a level of information. Graphs of the multilayer versioned graph tree can be contained in the following kind of layers:

"User layers" are layers that only manage graphs that contain data specific to a user.

"Swarm layers" are layers that only contain information common to a group of users.

"Global layers" are layers that only contain information common to all the users.

A "graph server" is a computer inside a group of machines. The group of machines only host servers dedicated to a particular level of information: the level of information of the group of machines.

"A cluster of servers" is a group of servers dedicated to a specific level of information. Each layer of information is hosted by a specific group of machines. A group of machines can only manage graphs that belong to its level of information.

Therefore, there are only three kinds of groups of machines:

A "user" group of machines hosts graphs that contain information specific to a particular user.

A "swarm" group of machines hosts graphs that contain information specific to a particular group of users.

A "global" group of machines hosts graphs that contain information specific to all the users.

General Hardware architecture

Figure 1:
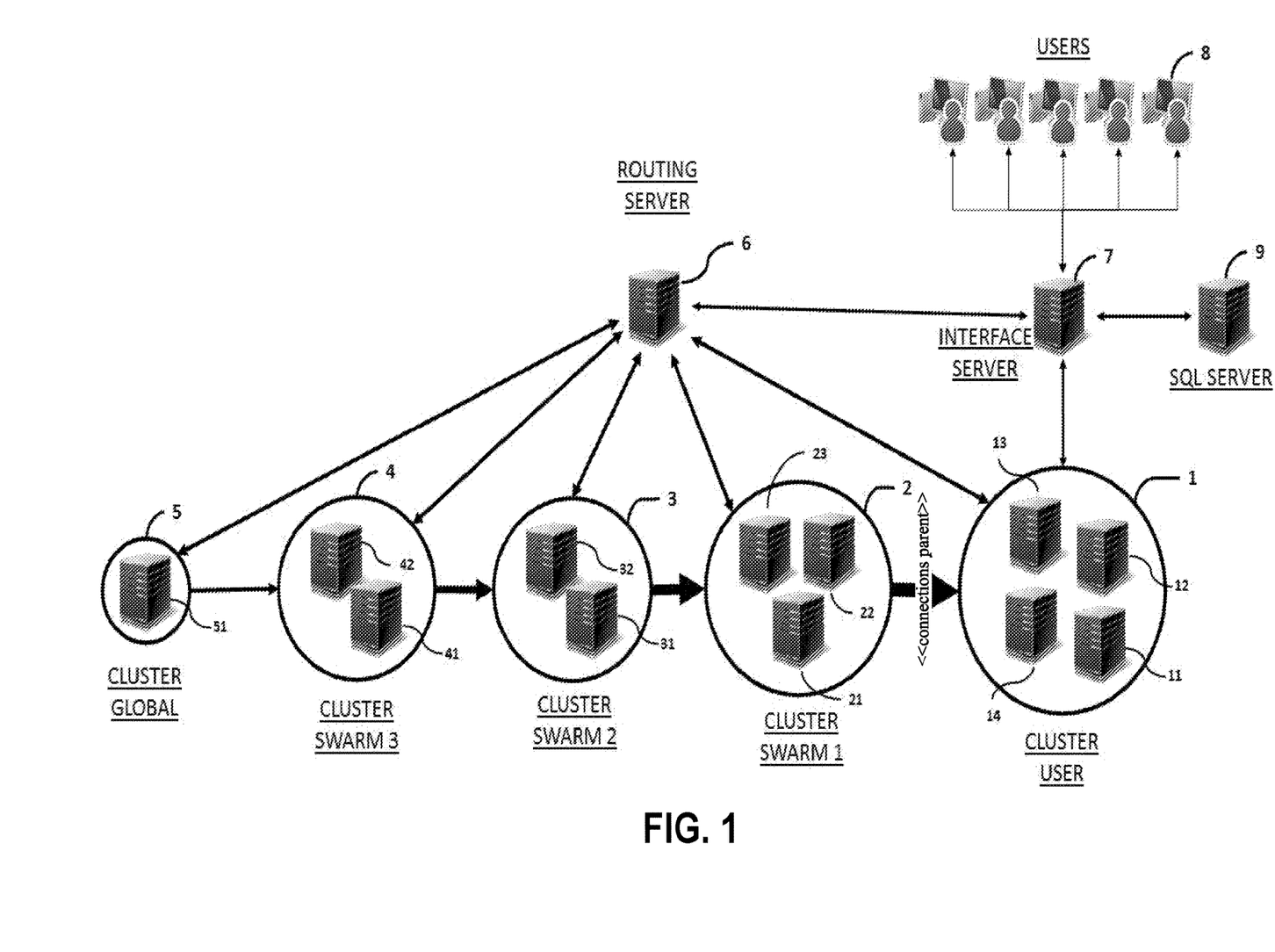
FIGS. 1 and 2 show schematic views of an example of the hardware architecture related to the system disclosed herein.
Figure 2:
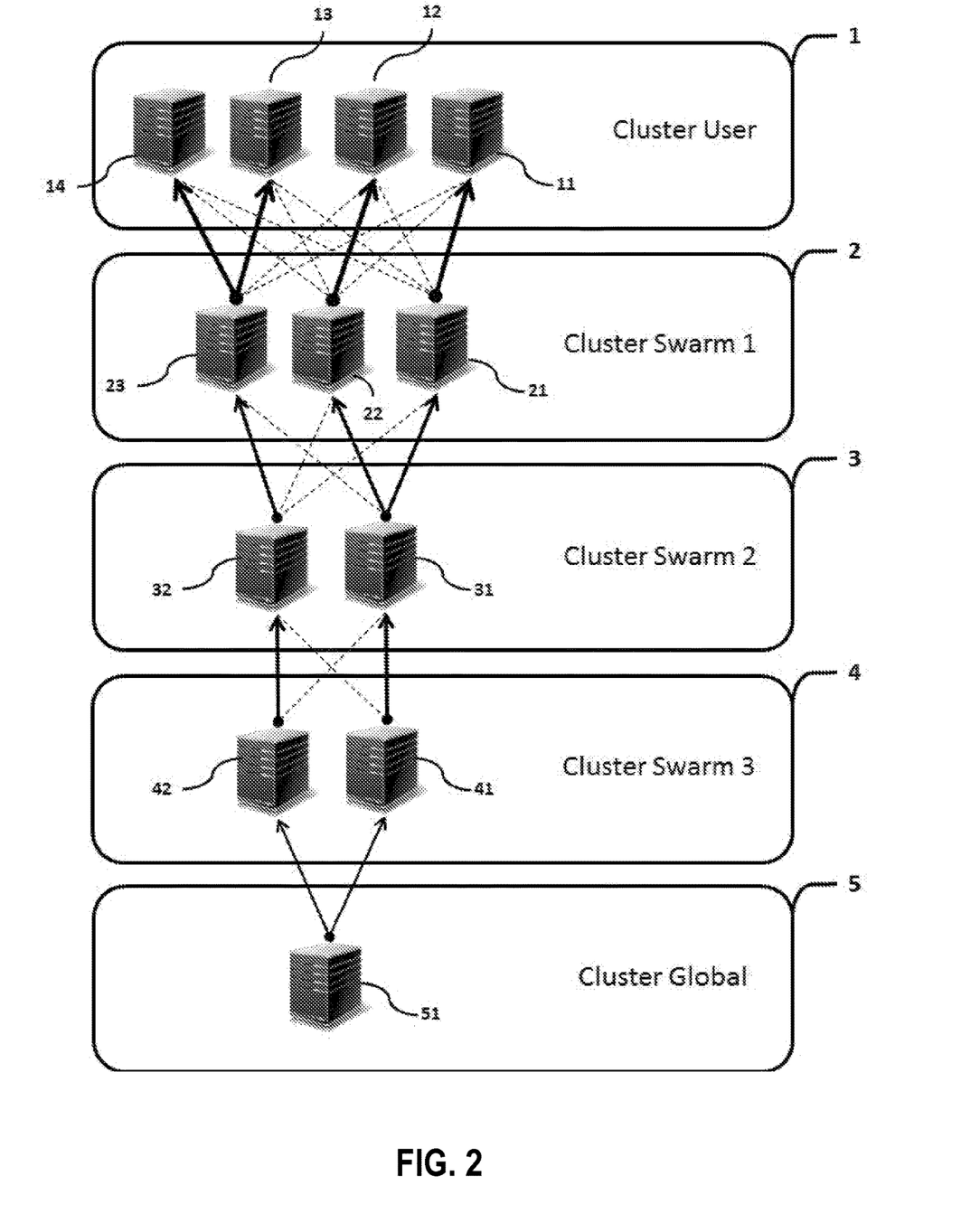

FIGS. 1 and 2 are schematics of the hardware architecture of the system.

The system is made from a set of servers that is split into server clusters. Furthermore, such clusters are set up in layers:

The "user" or "upper" layer 1 includes servers 11 to 14.

Layers 2 through 5 are prioritized according to their level of information.

A routing server 6.

The system also includes an interface server 7 that implements means of interfacing with the users' equipment 8. It also includes a SQL server 9 that manages the user access codes to secure the access of the users to their personal graphs.

The Interface Server

The interface server 7 is made from a computer equipped with a multi-core processor. This way, such computer is able to execute a server application and manage sessions of each user in parallel.

Such server also embeds cryptographic means, so that it encrypts any routed information during any session.

The interface server 7 also deals with the decoupling between the layer servers 1 through 5, the routing server 6 and the equipment of the users 8. Such a decoupling is meant to ensure the safety of all data recorded in the system.

The interface server 7 only communicates with:
the routing server 6,
the upper layer 1 of servers 11 through 14, and
the SQL server 9.

The interface server 7 is made from a single computer.

Upper Layer 1 and Lower Layers 2 Through 5

The upper layer 1 is made from a servers cluster. Each server from this kind of cluster is equipped with a multi-core processor, RAM memory and a permanent storage means, such as a hard drive.

Servers 11 through 14 of the upper layer 1 communicate as a result of a ring-shaped protocol. The servers 11, 12, 13, and 14 only communicate with servers 12, 13, 14, and 11, respectively.

Communication between the interface server 7 and any server 11 through 14 of the upper layer 1 is monitored by the routing server 6.

Each server 11 through 14 of the upper layer 1 communicates with each server 21 through 23 of the lower layer 2, and so recursively processes with routing server 6, monitoring locally saved information.

Any server of a given layer communicates with each server of any given adjacent layer.

The servers 11 through 14 manage the following functions:

requesting the servers of the lower layers, in order to get any needed information, processing the information that is available at the current context level, and sending gathered and preprocessed data to the interface server 7.

Each server 11 through 14 has a memory cache for the purpose of both recording and saving ephemeral and permanent data. Such digital data corresponds to partial information that originates from the graphs.

If a user submits a request, then such request will be performed in arborescence through the server layers 1 through 5.

In each layer 1 through 5, a server decides which information must be transferred to a server of the layer above after having possibly performed a local processing and/or after sending a request to the layer below.

The routing server 6 determines which communication paths between the server pairs have to be implemented according to a routing table linked each graph identifier.

The server that has to call a server of an adjacent layer, sends to the routing server 6 a digital message that encloses a key that has been generated from:
the server identifier,
the identifier of the targeted graph, and
the identifier of the parent of the targeted graph.

The Final Gathered Configuration

If every server of a group of machines 1 through 4 is connected to every server of the lower adjacent group of machines 2 through 5, all communication paths between each couple of servers will not be used since the graphs are organized depending on the similarities between the arborescence they share with the other graphs hosted by their server. Therefore, some paths will be fully used whereas others will be largely underused.

FIGS. 11 through 18 represent the data evolution inside the cache of the user server that hosts a graph over which a user performs 500 successive requests.

FIGS. 11 through 14 deal with the case where the size of the data that are exploited by a user exceeds 50% of the regular size of the cache.

One can notice that the size of the cache of the multilayer versioned graph gets stabilized around the maximal server cache size.

If the user's information need exceeds the cache capacity, the less frequently used data are continuously erased and recalled from the lower layers.

FIGS. 15 through 18 illustrate the situation where the size of the data exploited by the user remains below the maximal cache capacity.

One can notice that the multilayer versioned graph has a stabilized size that equals the size of the data required by the user.

Given the fact that the user needs less information than the cache is capable of storing, all of the information is kept in the cache. Only the data that are definitely no longer used are removed from the cache.

Figure 3:
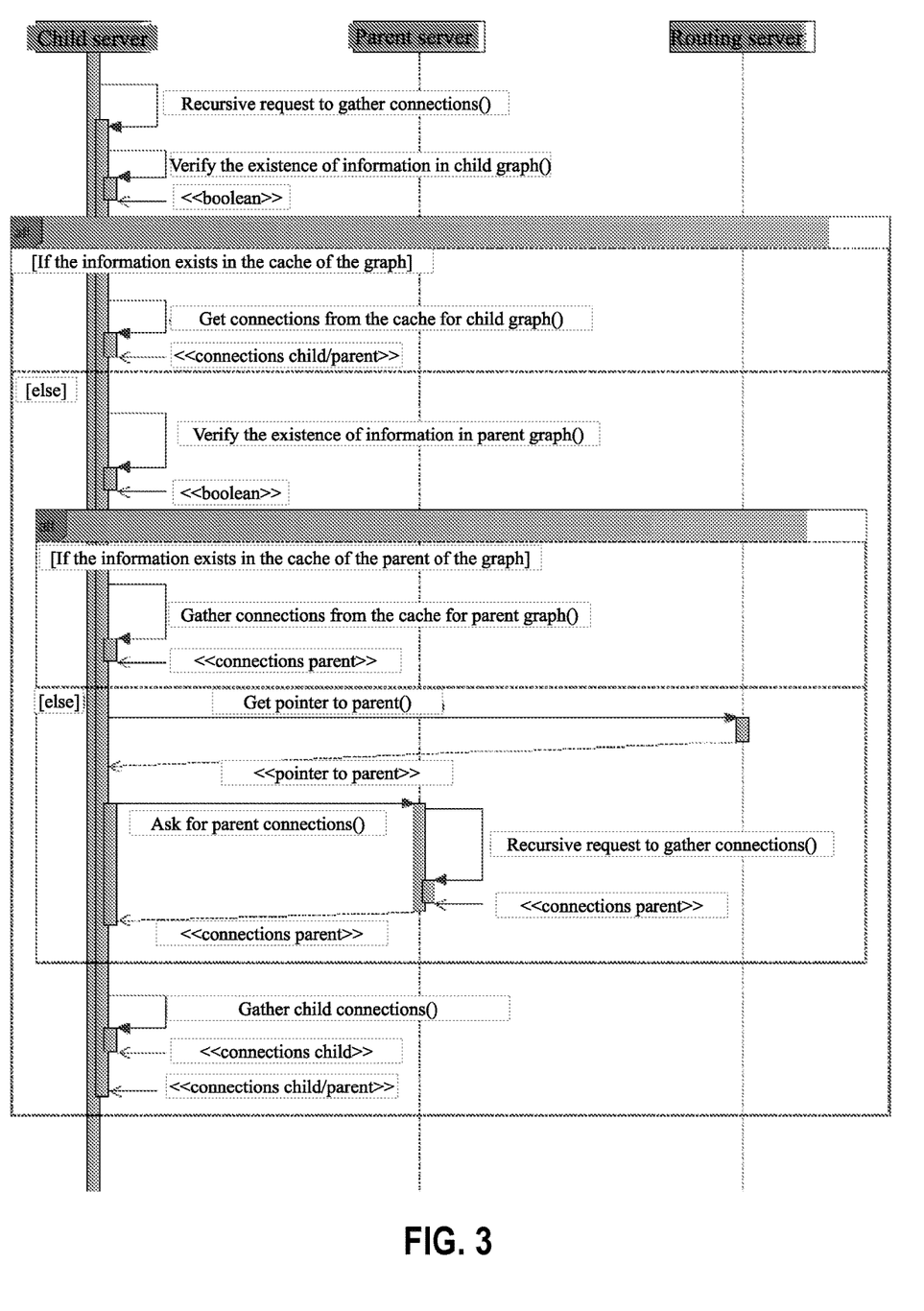
FIG. 3 shows a schematic view of the sequence of a search for information in lower layers where all of the edges of a vertex are gathered through the graph filiation.
Figure 4:
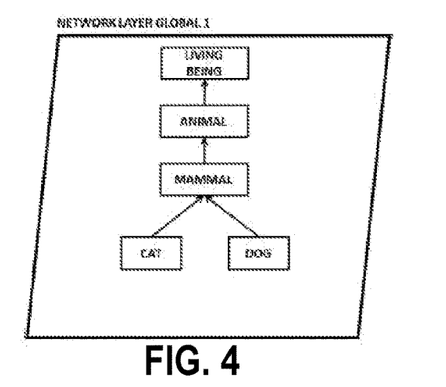
FIG. 4 is a network layer global 1 showing a simple ontology shared by another user illustrating different versions of the multilayer graph shown in FIG. 11, wherein "cat" is only a "mammal," an "animal" and a "living being;"
Figure 5:
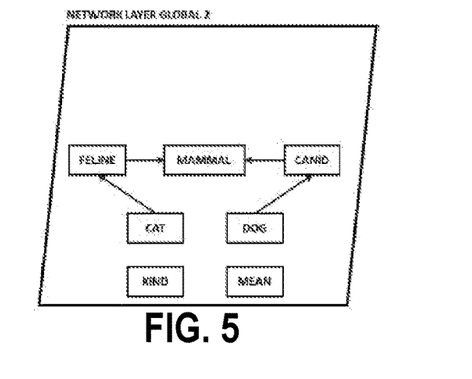
FIG. 5 is a network layer global 2 showing a simple ontology shared by another user illustrating different versions of the multilayer graph shown in FIG. 11, wherein "cat" becomes a "feline," a "mammal," an "animal" and a "living being;"
Figure 6:
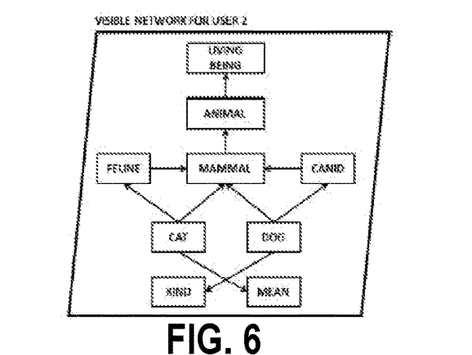
FIG. 6 is a visible network for user 2 showing a simple ontology shared by another user illustrating different versions of the multilayer graph shown in FIG. 11 and is the result of dividing the graph tree of FIG. 8 into two graph leaves, wherein the graph leaf of FIG. 6 is specific to user 2 (in FIG. 6, a "cat" is mean)
Figure 7:
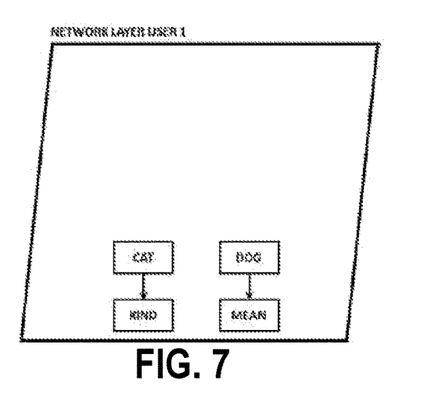
FIG. 7 is a network layer for user 1 showing a simple ontology shared by another user illustrating different versions of the multilayer graph shown in FIG. 11 and describes information that is specific to user 1 and is the result of splitting the chart of FIG. 5 into two branches, each a complementary version of the other where
Figure 8:
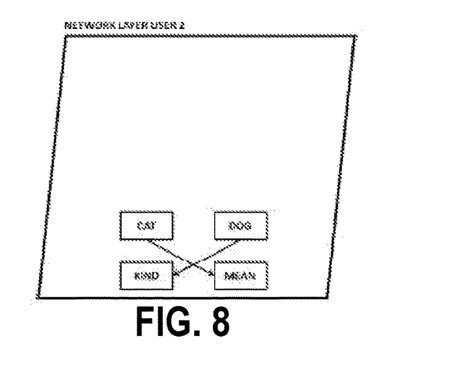
FIG. 8 is a network layer for user 2 showing a simple ontology shared by another user illustrating different versions of the multilayer graph shown in FIG. 11 and describes information that is specific to user 2 and is the result of splitting the chart of FIG. 5 into two branches, each a complementary version of the other where
Figure 9:
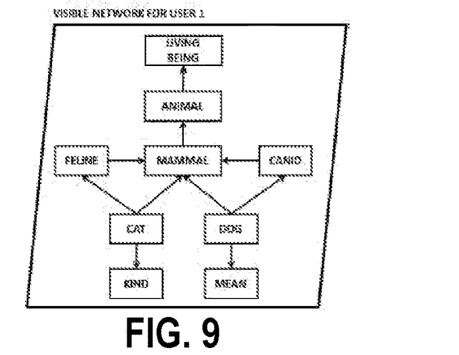
FIG. 9 shows the final graph that is a visible network for user 1 and is the result of dividing the graph tree of FIG. 8 into two graph leaves, wherein the graph leaf of FIG. 9 is specific to user 1 (in FIG. 9, a "cat" is kind)
Figure 10:
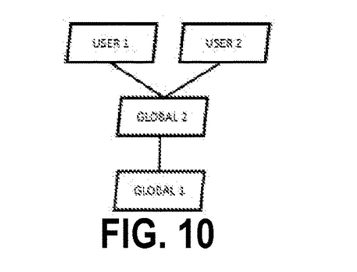
FIG. 10 shows the final graph that is a visible network for user 2.
Figure 11:
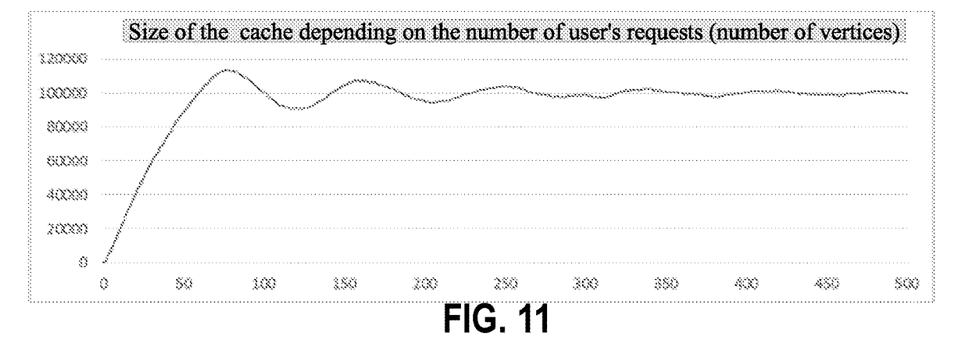
FIG. 11 is a multilayer versioned graph managing two users' data and charting the size of a cache depending upon the number of user requests (number of vertices)
Figure 12:
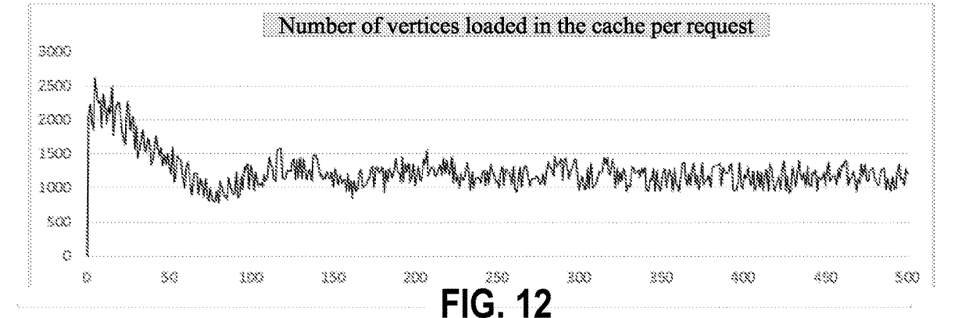
FIG. 12 is a graph charting the number of vertices loaded in the cache per request.
Figure 13:
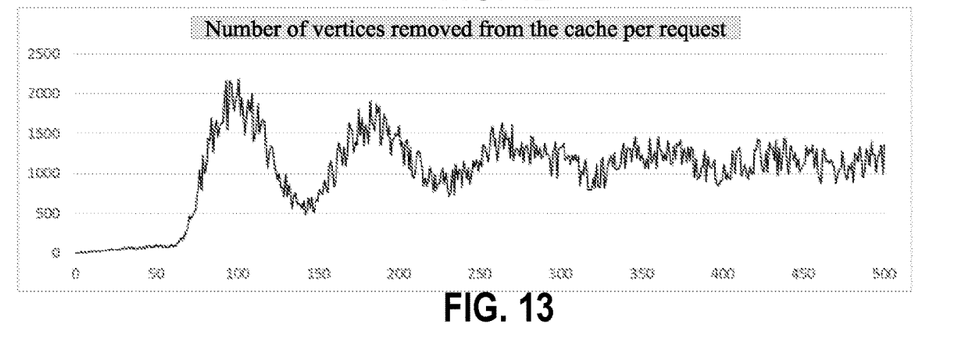
FIG. 13 is a graph charting the number of vertices removed from the cache per request.
Figure 14:
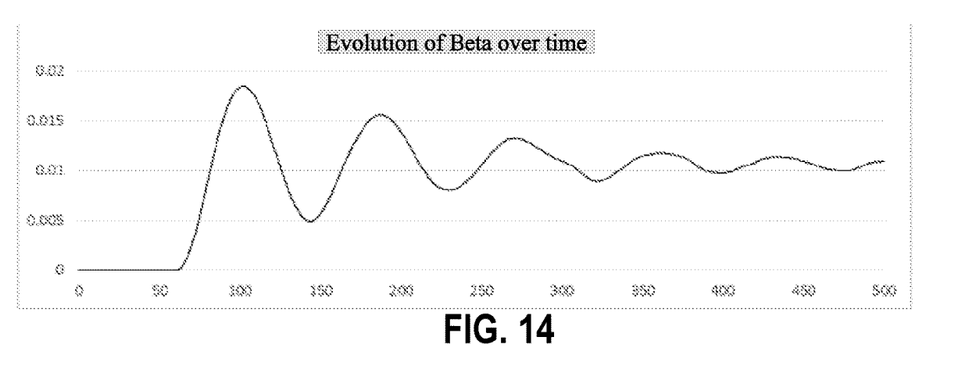
FIG. 14 is a graph charting the evolution of beta over time.
Figure 15:
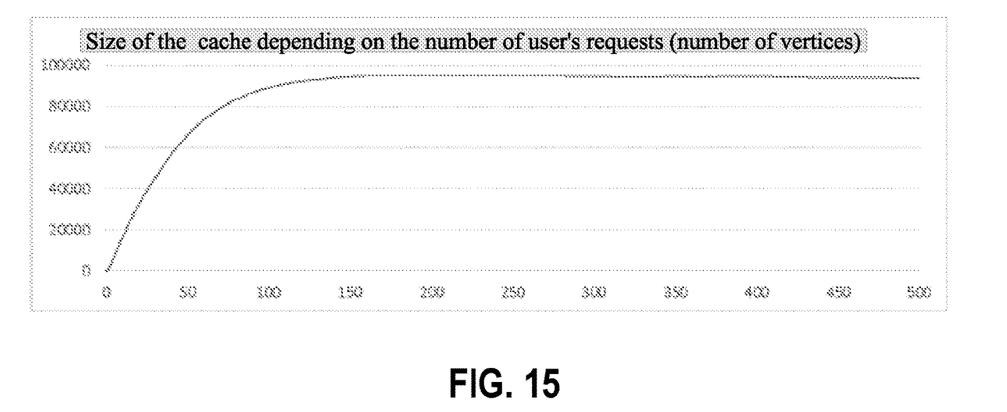
FIG. 15 is a graph charting the size of the cache depending upon the number of user requests (number of vertices)
Figure 16:
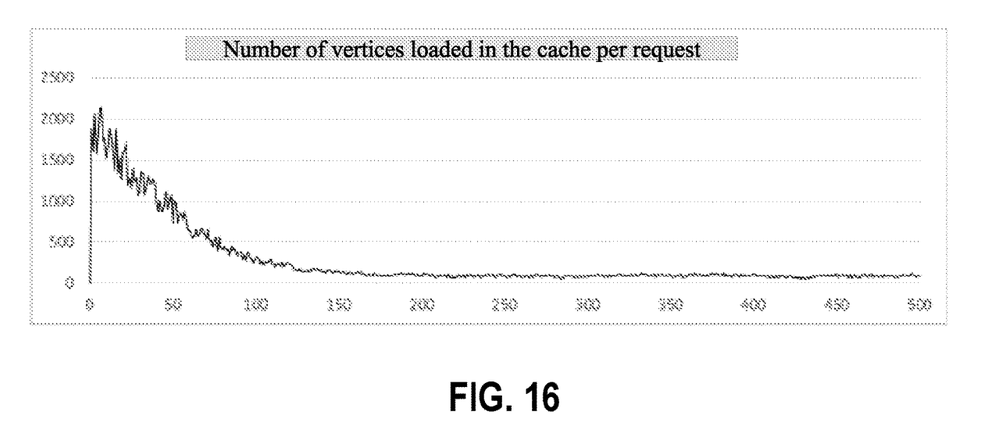
FIG. 16 is a graph charting the number of vertices loaded in the cache per request.
Figure 17:
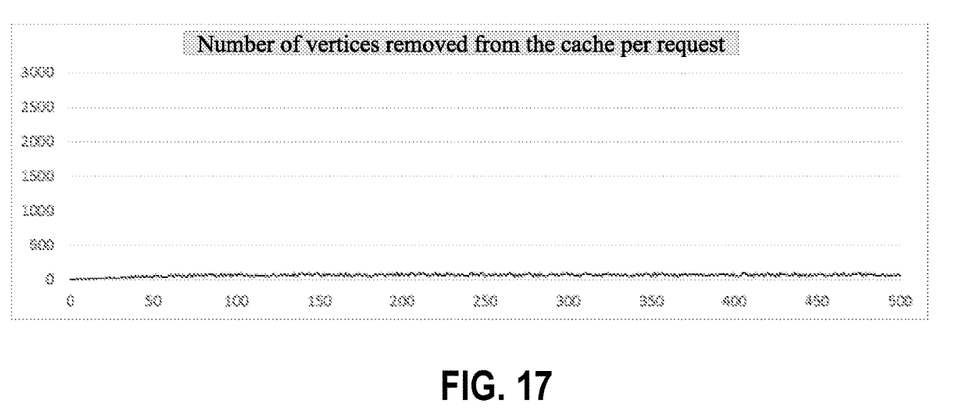
FIG. 17 is a graph charting the number of vertices removed from the cache per request.
Figure 18:
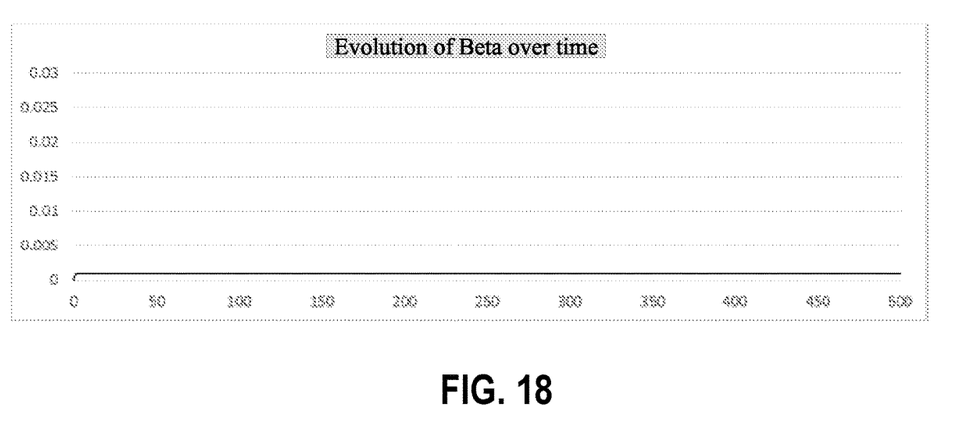
FIG. 18 is a graph charting the evolution of beta over time.

As shown in FIG. 3, when a request over the graph is submitted, the request is about to be recursively performed by each server that hosts every element of the graph filiation.

Given any performed request, each server's cache will be updated. This way, when a request is processed, a search is conducted to find a potentially already existing result in the cache.

Functional Architecture

The following description is about an example of functional architecture that deals with the specificities of a versioned multi-layered graph by distributing and processing the data over several servers. Every graph that is proper to a given user will actually be a version of a root graph.

A graph that is dedicated to a user will then be defined by its inner information and the information that is enclosed in the filiation of the graphs it inherits.

The different layers of the graph are processed by different groups of machines. The aim is managing the information transfers between the graph layers, so that the request can be fully executed on the server of the user's graph.

The goal is to save a huge amount of time by spreading out the graph processing over different servers that are spread out over different groups of machines, making the system more stable by avoiding the entire centralization of the information and the processing of such information on a single server.

Description of a Requesting Process

Allocation of a new graph.

Interaction with the interface server.

When a user loads a graph, such graph has to be allocated in the USER machines group. Then, the user is able to use it.

First, the user connects to the interface server. Next, as the user is connected, he gets the graphs that are associated to him in the database at his disposal. The graphs of a given user are referenced in a SQL database in order to know which graph belongs to that user.

A user can only interact with the user's own graphs. Those graphs can only belong to the upper layer of the general multilayer versioned graph.

When a user wishes to work on one of his graphs, the interfacing server sends a request on allocating the requested graph and the graph filiation in the groups of servers.

Server Decision Process in Charge of the Allocation

When a graph has to be instantiated by a group of machines, the servers of the group of machines have to decide which of them will allocate it.

In order to make such decision, the servers of the machines group concert each other to determine which one of them will allocate it.

The servers of the group of machines are organized like a ring. A given server is only aware of another server from the same group of machines. Every time a graph has to be instantiated, a request runs through the ring. The routing server calls on the server of the machines group and demands to make the request keep running.

The request must round three times in the ring:

During the first round, each server must fill the request with information regarding its CPU usage, its available amount of memory and the filiation index.

The filiation index $I\_fil(G,S)$ is the correlation between the filiation of the graph that is wished to be instantiated and the filiation of the graphs that are already hosted on the server. G is the graph that has to be instantiated, S is the server that is currently tested for graph (G) hosting.

This index is given by the following equality:

$$I\_fil(G,S) = \mathrm{argmax}_I(\forall G\_i \text{ where } G\_i \text{ hosted on } S)((\mathrm{common\_filiation\_size}(G,G\_i))/(\mathrm{max}(\mathrm{filiation\_size}(G),\mathrm{filiation\_size}(G\_i))))$$

During the second run, the request now embeds information from all servers of the machines group. The server that gets the request completes it with its own decision regarding which server of the ring has to manage the to-be-allocated graph.

Every server must know which server among the ring has to host the graph the user asked, each server associating to each server of the ring with a specific index: the allocation index.

The allocation index is described by the following equality:

$$I\_all(G,S) = \sqrt{((\text{available memory size}*\text{average CPU charge})/(\text{total memory size}*\text{maximum CPU charge}))\hat{\;}2 * I\_fil(G,S))}$$

Through this process, the server with the smallest charge and closest filiation to the filiation of the graph the user wants to instantiate will be chosen. Information is centralized at the maximum in the lower layers and the size of the memory caches is drastically reduced.

During the third round, the request contains the decision of each server of the ring. The request rounds until it arrives to the chosen server. The chosen server does not redirect the request; it instantiates the graph and informs the routing server about it.

Connection Between User Graph Server and Servers of the Graph Filiation

A graph has a parent. However, the parent is not expected to be hosted on the same server nor the same machines group. It is necessary to localize where the parent of the graph is to send it requests.

Therefore, when a first request is received, a server must send a request to the routing server to know the address of the parent graph. By this process, the graph can ask its parent information directly, even if the parent is hosted elsewhere.

Each server of each group of machines communicates with the routing server to know what server is needed to address in order to request missing information from a deeper graph.

A graph server sends a key to the routing server. This key contains three attributes: the unique identifier of the key, the server IP that sends the key and the identifier of the parent graph desired to be localized.

The routing server sends a response that contains three attributes: the unique identifier of the initial request the routing server is answering, the Boolean result of the request and the IP of the server that contains the wanted parent graph.

When a server allocates a graph, it sends a request to the routing server.

The request contains five attributes: the IP of the server, the identifier and the level of information of the graph, and the identifier and the level of information of the parent graph.

The routing server updates the routing table each time it receives such request.

When a graph is allocated, the routing server links together the identifier of the graph and the IP of the server that hosts it.

Recursive Allocation of a Graph and its Filiation

If the identifier of the parent graph does not exist in the routing table, the routing server sends a request to the relevant group of machines depending on the parent graph level of information in order to make the group of machines allocate it.

It results in a recursive allocation of all the graphs of the wanted graph filiation.

Completion of Missing Information in an Allocated Graph

Data required by the user are spread in the graph filiation. The parents of the graph are hosted by different servers from a different group of machines.

Therefore, data from lower graphs must be ascended to complete the data upper graphs have to process.

This data completion is crucial to make any versioned and distributed graph work.

Information completion can only concern information about vertices. A vertex has two attributes: its internal information and its edges.

A vertex contained in a graph filiation of a multilayer versioned graph can be either a root vertex, or a versioned vertex that relies on the root vertex contained in a lower graph.

Only a root vertex has internal information. Versioned vertices only have information about edges that must be removed or added.

Information completion requests are processed recursively (FIG. 2). Each server that contains, respectively, each graph of the filiation executes a request to complete the initial request of the upper graph.

A multilayer versioned graph has two different types of completion requests:

Edge completion request: recover all the edges of a vertex from a parent graph hosted in a lower machines group. This request is mandatory to get all the edges of a vertex depending on its version.

Internal information completion request: recover a copy of the internal information of a root vertex from a parent graph hosted in a lower machines group. This request is mandatory to get the real nature of a versioned vertex contained in an upper graph.

Building of a Degenerative Memory Cache

The purpose of a degenerative memory cache is to keep a trace of the results of the requests and the operations done.

In order to reduce the number of requests from upper graphs to lower graphs, each graph server has its own cache.

A degenerative cache contains three types of information:
Information related to the previous processes done on the graphs hosted by the server.
Information related to vertices and edges from parents of the graphs hosted by the server.
Information related to processes done on parents of the graphs hosted by the server.

Therefore, when a graph needs information from its parent graph, the server is checking to see if the information is not already contained in the degenerative memory cache.

When an operation is processed or a piece of information is requested from lower graphs, the result is stored into the cache of the server that processes the operation.

When a recursive operation is processed on a graph filiation, degenerative caches of the servers that host that filiation are filled up.

Therefore, the bigger number of requests a server does, the less it will be necessary to do other requests in the future.

The flow of data between graph servers is quickly decreasing, until a change happens in the filiation of the graphs.

When a change happens in a lower graph, degenerative caches of graph servers that contain information about the graph or its parents delete all information related to the data alteration.

When a change happens in a graph, the server that hosts the graph sends a request to all the servers from the higher group of machines in order to properly clean the degenerative caches.

The deeper the graph is, the less likely the graph is to change. Therefore, information deletion requests are mostly infrequent and controlled.

Plus, each server of the graph filiation is expected to fill its own degenerative cache. Therefore, a change in a medium graph will not challenge caches of the lowest graphs.

Progressive Destruction of Non-Used Information

The principle of degenerative cache is simply to assure there is a balance between the request flow among all groups of machines and the available memory of each graph server.

At each new request, information is likely to be deleted if it is not used during the request. The less a piece of information is used, the more likely it is to be deleted.

$\beta$ is a variable that indicates the degenerative factor of a degenerative cache. The server constantly changes the $\beta$ value to make the size of the cache match the allocated cache size.

As defined herein, f_space(k) functions to calculate the current memory charge of the cache:

$$f\_space(k)=(cache\_size(k)-cache\_maximum\_size)/cache\_maximum\_size$$

$\beta$ value is iteratively calculated at each new request. $\Delta\_\beta=0.01$, $\alpha\_\beta=1.08$, and $\beta\_min=0.001$.

$$\beta(k+1)=\max(\beta\_min,\beta(k)+((2*\Delta\_3)/(1+e\hat{}(-\alpha\_\beta*f\_space(k)))-1))$$

In each new received request, the graph server tests each one of the existing information stored in its cache.

k is the number of user requests done since the last time the information has been used. Each information stored in the degenerative cache is related to a life expectancy probability P(k), ruled by an exponential decay law.

P(k) probability that the information will not be deleted is ruled by the following equality:

$$P(k)=e\hat{}(-\beta k)$$

Each time a piece of information is requested inside the cache, its lifetime k is reset.

Therefore, the size of the cache will not indefinitely increase. The cache will always contain what is truly useful for the server. It quickly reaches a permanent size.

Counting the Number of Processed Requests

A degenerative cache is evaluating time through the number of requests that are processed by a graph and its parents.

Therefore, it is possible to know the number of requests done by a graph and its children only if there is a regular and recursive ping request that informs the graph about the number of requests processed by its children.

The number of processed requests by a parent graph will be the sum of all the requests processed by its children.

Content Creation in the User's Personal Graph

Content creation in a graph needs an ID system to identify each vertex of the graph.

A vertex inside a multilayer versioned graph is always labeled by an ID. This vertex ID is the same for each version of the vertex in all the graph filiation.

When a user works on his graph, the graph constantly creates new vertices.

Therefore, in multilayer versioned graphs, a graph must be synchronized with the rest of its filiation to never allocate an ID that already exists in the filiation.

In order to do this, each graph has its own ID range. This available ID range is delivered by its parent graph.

All the graphs that share the same filiation have the same root graph. Therefore, this root graph generates all the ID ranges and distributes them to its children.

When a graph wants to allocate a new ID, it has to send a request to its parent to get a new available ID range.

The parent graph must constantly provide its children with available ID ranges.

This protocol is recursive. When a parent delivers an available ID range, the parent gives parts of its own ID range to its children. If a parent consumed all of its own available ID range, it will send a request to its own parent graph to get a new one.

Linking a New Vertex Created by the User

When a user creates content in his graph, he is likely to create new vertices that already exist in lower graphs. By doing so, there would be two times the same label for two different vertices in the same graph filiation.

To deter this situation from happening, the graph server sends a linking request each time a new vertex is created in the user's graph.

A linking request is looking in the lower layers for an existing vertex with the same internal information as the internal information contained in the newly created vertex.

If such vertex is found, it is returned as a result. The vertex that should have been created is not a root vertex anymore, but a new versioned vertex, which will complete the filiation of the known root vertex in the lower graphs.

Hashtables

Such mechanism can not stand an intensive content creation from the user side. For this reason, each graph is linked to a hashmap.

A SHA-2 hash function is defined to turn internal information from a graph into eight-octet fingerprints.

On a one million vertex graph filiation managed by the user, collision risk to make two vertices with different internal information that have the same hash fingerprint has a probability of $5.4*[10]^{\wedge}(-12)\%$ each time a new vertex is created.

When a graph creates a new vertex, it updates its hashtable to relate the vertex ID with the fingerprint obtained through the hash function.

When a new graph is allocated, its hashtable is filled up with the aggregation of all the hashtables from its parent graph. This aggregation is directly the hashtable of the parent of the new graph.

As seen, graph allocation is recursive: all the filiation of the graph has to be instantiated before the graph itself can be instantiated.

Therefore, hashtable initialization follows the same recursion. Each graph will see its hashtable be initialized with the fingerprints of its vertices and the content of the hashtable of its direct parent graph.

When a vertex is created by the user, a search inside the user's graph hashtable is done. So it becomes easy to know if the filiation of the graph contains a root vertex similar to the one the user wants to create.

If a relevant fingerprint is found, a linking request is required. In the other case, no linking request is possible and a new root vertex is simply created in the graph.

When a lower graph gets new vertices, a request is sent to its children to update their own hashtables.

It is not an issue, because lower graph alterations are planned and rare events.

When a graph is instantiated, the parent graph must send to the new graph its own aggregated hashtable. In a one million vertices graph filiation, such request will be 8 mega octet sized. As all groups of machines are connected each other through a local ethernet connection, it implies a loading time that lasts less than 100 milliseconds when a new graph is loaded.

In terms of hashtable storage and data exchange, their recursive property is used. The hashtables received by the server are stored in the server itself. Hashtables of the server graphs rely on the server hashtable to fill themselves up.

Through this process, the redundance of stored hashtables in memory is reduced. It depends on the fact that numerous graphs of a server will have a very similar filiation. Therefore, their hashtable has a common base for the most part.

User Disconnection

When a user wants to disconnect, all of the graphs the user was manipulating need to be deallocated.

During allocation requests, the routing server updates a dependency table. This table stores all the dependencies between all the allocated graphs.

When a graph is deallocated, the routing server deletes the association between the identifier of the graph and the IP of its server inside the routing table. It also deletes any dependency that would imply the deallocated graph.

At each deallocation, the routing server analyzes the dependencies of each known graph to check if some of them had only the deallocated graph as a child.

If a graph no longer has any dependency in the dependency table, it is now pointless to keep it allocated. The routing server asks the server that hosts the useless graph to deallocate it.

It results in the recursive deallocation of all graphs that do not have an allocated user graph in their descendants.

The invention claimed is:

1. A distributed computing system made of a plurality of physical servers, each physical server of the plurality of physical servers containing a processor to process computing treatments and a memory to save graphs, routing means between all the physical servers, an interface server to process requests from a plurality of equipment, wherein the plurality of physical servers is organized in at least three layers of physical servers, each layer of the at least three layers containing a group of physical servers, with physical servers from the same layer organized in a ring topology, each physical server of the ring topology having a communication protocol with other physical servers of the ring topology, each physical server of the group of physical servers having a communication protocol with a routing server, wherein:

each physical server of a layer of the at least three layers communicates with each physical server of an adjacent lower layer of the at least three layers; and each physical server of the layer comprising:

a memory cache to: record and save graphs that are specific to a user or a group of users;

record and save hashed data that summarizes content of graphs hosted in lower layers;

record and save ephemeral results of user operations and treatments, from the lower layers and/or a user layer; and record and save ephemeral data gathered from the lower layers; and wherein the distributed computing system is configured to perform a requesting process for a multilayer graph, the multilayer graph hosted on each of the layers of the physical servers, the group of physical servers hosting data specific to elements of the multilayer graph, the requesting process including:

instantiation steps of elements of the multilayer graph, the instantiation steps including:

select one physical server of the group of physical servers to instantiate the multilayer graph depending on parameters selected from among CPU charge of each server of the group of physical servers, type of element to instantiate, similarities between filiation of the elements already instantiated in the selected physical server and filiation of the element to record in the selected physical server; and         propagate the instantiation in the group of physical servers; and     completion steps of the hosted data comprising recursively transferring the hosted data between physical servers of two adjacent layers of the at least three layers in response to a detection of a lack of information in an upper layer of the at least three layers.

2. The distributed computing system of claim 1, wherein an upper layer of servers contains data partitions specific to each user.

3. The distributed computing system of claim 1, wherein the interface server comprises interfacing means for interfacing with the plurality of equipment.

4. The distributed computing system of claim 3, wherein the interface server comprises a computer comprising a multi-core processor to process requests in parallel from different users and run a server application that manages a session for each user in a different thread.

5. The distributed computing system of claim 4, wherein the interface server embeds cryptographic means to encrypt any routed information during the session for each user.

6. The distributed computing system of claim 3, wherein the servers of different layers, the routing server and the plurality of equipment are decoupled by the interface server to protect data inside the system.

7. The distributed computing system of claim 6, wherein the interface server is made of a unique machine.

8. The distributed computing system of claim 3, wherein the interface server only communicates with the routing server, an upper layer of servers and an SQL server.

9. The distributed computing system of claim 1, wherein the system contains a SQL server, the SQL server managing access code of the user or group of users to secure access to a graph specific to the user or the group of users.

10. A requesting process in real time of a multilayer graph structured information system including at least three layers, each layer of the at least three layers comprising a group of physical servers, the multilayer graph structured information system further including a routing server and at least one database server, the group of physical servers hosting data specific to elements of a multilayer graph, the requesting process comprising:

instantiation steps of the elements of the multilayer graph comprising:

selecting one physical server of the group of physical servers to instantiate the multilayer graph depending on parameters selected from among CPU charge of each server of the group of physical servers, type of element to instantiate, similarities between filiation of the elements already instantiated in the selected physical server and filiation of the element to record in the selected physical server; and         propagating the instantiation in the group of physical servers;

completion steps of the hosted data comprising recursively transferring the hosted data between physical servers of two adjacent layers of the at least three layers in response to a detection of a lack of information in an upper layer of the at least three layers;

recording transferred data in a memory cache associated with physical servers of a lower layer and the upper layer; and     data synchronization steps between the lower layer and the upper layer, preserving an integrity of the hosted data when users are producing content.

11. The requesting process of claim 10, wherein the requesting process comprises a progressive destruction mechanism of non-used information.

\* \* \* \* \*